United States Patent
Brian Nielsen

(10) Patent No.: US 8,108,999 B2
(45) Date of Patent: Feb. 7, 2012

(54) METHOD OF ASSEMBLING A HEARING AID

(75) Inventor: Dennis Brian Nielsen, Helsinge (DK)

(73) Assignee: Widex A/S, Lynge (DK)

( * ) Notice: Subject to any disclaimer, the term of this patent is extended or adjusted under 35 U.S.C. 154(b) by 1710 days.

(21) Appl. No.: 11/275,910

(22) Filed: Feb. 2, 2006

(65) Prior Publication Data

US 2007/0177750 A1   Aug. 2, 2007

(51) Int. Cl.
*B23P 15/16* (2006.01)
*H04R 25/00* (2006.01)

(52) U.S. Cl. ........... 29/896.21; 29/827; 29/830; 29/832; 29/837; 381/324

(58) Field of Classification Search ............... 29/896.21, 29/830, 832, 827, 837, 255; 381/328, 330, 381/360, 322, 324, 325; 181/129, 130, 135, 181/183, 189
See application file for complete search history.

(56) References Cited

U.S. PATENT DOCUMENTS

| | | | |
|---|---|---|---|
| 5,201,008 A * | 4/1993 | Arndt et al. | 381/323 |
| 5,535,282 A * | 7/1996 | Luca | 381/328 |
| 6,205,227 B1 * | 3/2001 | Mahoney et al. | 381/328 |
| 6,430,296 B1 * | 8/2002 | Olsen | 381/322 |
| 6,731,770 B1 * | 5/2004 | Vonlanthen | 381/330 |
| 6,766,031 B1 * | 7/2004 | Westermann | 381/328 |
| 2002/0136420 A1 * | 9/2002 | Topholm | 381/312 |
| 2004/0010181 A1 * | 1/2004 | Feeley et al. | 600/25 |

* cited by examiner

*Primary Examiner* — Derris Banks
*Assistant Examiner* — Tai Nguyen
(74) *Attorney, Agent, or Firm* — Sughrue Mion, PLLC

(57) ABSTRACT

A hearing aid includes a shell (104) manufactured by a rapid prototyping process, so as to include a first part customized to adapt it to the shape of the ear canal of a user, and a second part that defines an aperture; an electronics module; and a plug (200) with means for retaining it in a fixed position in the shell. The shell has guideways (212) for guiding lateral portions of the plug to support the plug in the aperture. The shell is adapted to receive by the aperture the electronics module; and the electronics module is adapted to engage a lip (206) of the plug to secure it in the shell. The invention further provides a method of assembling a part of a hearing aid.

3 Claims, 4 Drawing Sheets

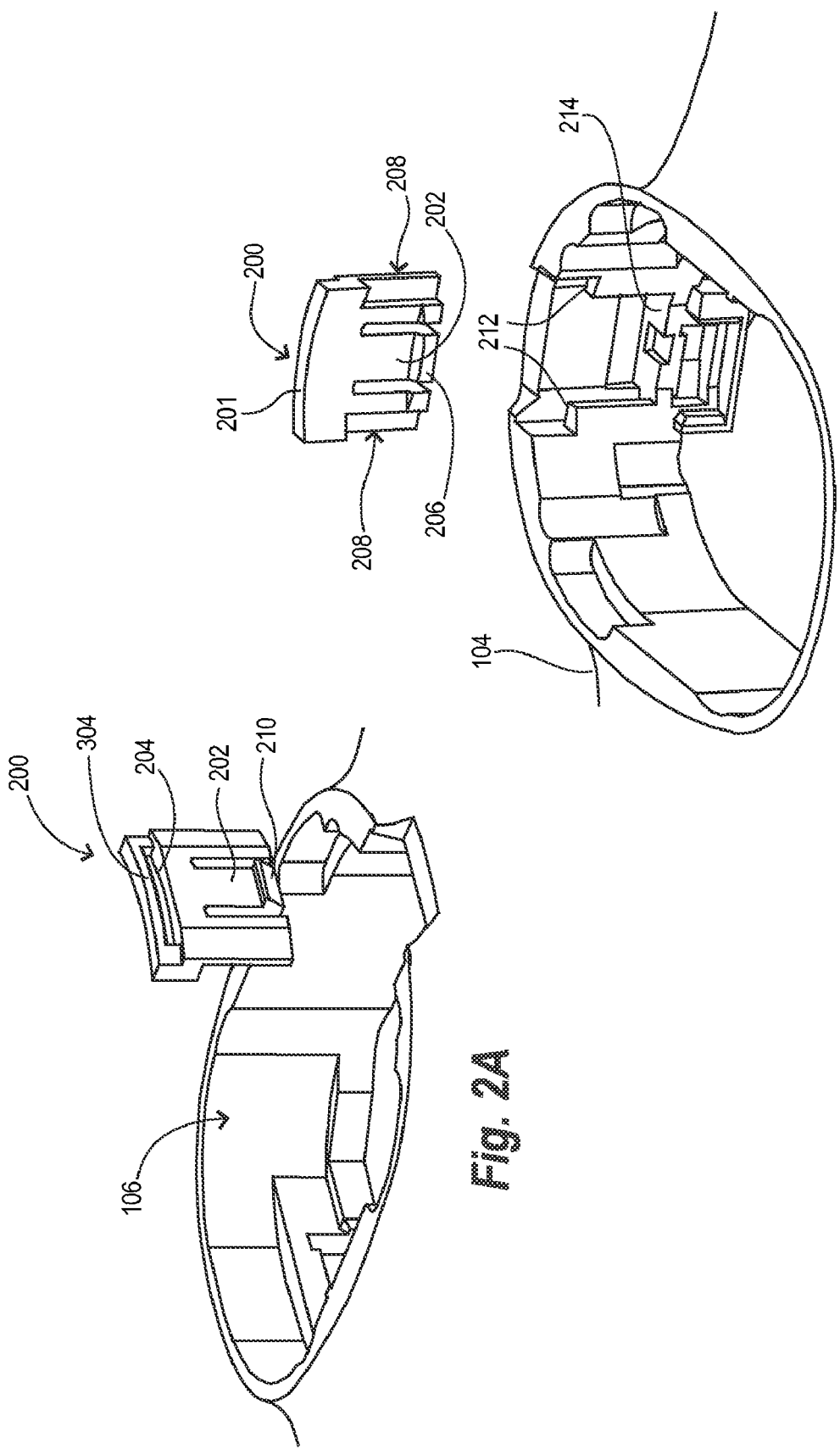

SECTION A-A

METHOD OF ASSEMBLING A HEARING AID

BACKGROUND OF THE INVENTION

1. Field of the Invention

The invention relates to hearing aids. The invention, more specifically, relates to hearing aids wherein part of the shell is custom made. The invention, in particular, relates to customized ITE (In-The-Ear) hearing aids. The invention further relates to methods of assembling a hearing aid.

2. The Prior Art

U.S. Pat. No. 5,487,012 explains the manufacturing of a shell for a hearing aid by computerized modelling of a shell adapted to the ear canal of a user and then building the shell by consecutive laser curing of layers of plastics. This method is traditionally referred to as digital shell manufacturing or Rapid Prototyping, although the method in the context of hearing aids is commonly used for manufacturing of the end product rather than prototypes.

When producing a custom shell for a hearing aid by a digital shell manufacturing method, it is difficult to obtain small tolerances. Therefore, it is common within the field to produce in a digital shell manufacturing process only the inner shell part, i.e. the part of the shell that should match the contours of the ear canal and the part of it that faces towards the eardrum, whereas the outer part, i.e. the part that faces the surroundings, or at least a section of that part, has been constituted by a faceplate manufactured by another method, e.g. injection molding. By producing the faceplate by injection molding it is possible to obtain a product with small tolerances and strong mechanical properties. However, separate manufacturing of the faceplate and the inner shell part complicates the manufacturing of the hearing aid, as the faceplate needs to be trimmed and joined to the inner shell part, e.g. by cutting and gluing.

SUMMARY OF THE INVENTION

It is an object of the invention to simplify the production of a hearing aid.

This and other objects are fulfilled by the present invention.

In a first aspect, the invention provides a hearing aid, comprising a shell manufactured to include a first part customized to adapt it to the shape of the ear canal of a user, and a second part that defines an aperture; an electronics module; and a plug with means for retaining it in a fixed position in said shell; wherein said shell has means to support said plug in said aperture; wherein said shell is adapted to receive by said aperture said electronics module; and wherein said electronics module is adapted to secure said plug in said shell.

The shell for the hearing aid may be manufactured to fit at least a part of the inner and outer portions of an ear of a user, e.g. part of the ear canal. It is an advantage that the plug is secured by the electronics module, since this means that the plug cannot be accidentally removed from the shell, once the hearing aid has been mounted.

In an embodiment of the invention the hearing aid further comprises a lid, such as a lid for a battery compartment. It is an advantage to provide a lid for a hearing aid since it provides selective access to interior elements, such as the battery, for replacement or repair.

In another embodiment of the invention, the plug comprises a recess adapted to receive a projection of said lid. This is an advantage since the lid for the hearing aid can be kept in a locked position by the projection latching into the recess of the plug thereby preventing accidental opening of the lid. Preferably the recess is formed in a part of the plug that projects above the adjacent portion of the shell by an overhang of about 0.3 mm. This allows keeping the small dimensions of the hearing aid.

In a further embodiment of the invention, the hearing aid may also comprise a guide means for leading said plug into the right position in said shell. The guide means may be a pair of guideways. The mounting of the plug is facilitated by the guide means since the plug may slide into the right position, wherein the guide means provides lateral support for the plug.

In an embodiment of the hearing aid, the plug further comprises a resilient prong with a latch, and preferably said shell and said plug are joined by a snap fit. This provides for a better joint of the plug and shell.

In yet a further embodiment of the invention, the plug may be made of plastics selected from the group consisting of (polyoxymethylene POM, polyarylamide PAA and polycarbonate PC). This ensures that the plug has suitable mechanical strength.

In a second aspect, the invention provides a method of assembling a part of a hearing aid, said method comprising the steps of manufacturing a shell by a rapid prototyping process, said shell having an aperture and a guide means; providing a plug; providing an electronics module; inserting said plug into said aperture by sliding said plug along said guide means; and mounting an electronics module into the shell, said electronics module being adapted to secure said plug in a fixed position. It is an advantage that it is possible to mount the plug directly into the shell without the need of additional measures, e.g. gluing.

In an embodiment a method is provided wherein the shell and the plug are joined by a snap fit. This provides for a better locking of the plug.

BRIEF DESCRIPTION OF THE DRAWINGS

The invention will be readily understood by the following detailed description in conjunction with the accompanying drawings, wherein like reference numerals designate like structural elements, and in which:

FIG. 2A shows a plug and part of a shell in exploded view;

FIG. 2B shows the details of FIG. 2A, as seen from a different angle;

DETAILED DESCRIPTION OF THE INVENTION

Figure 1:
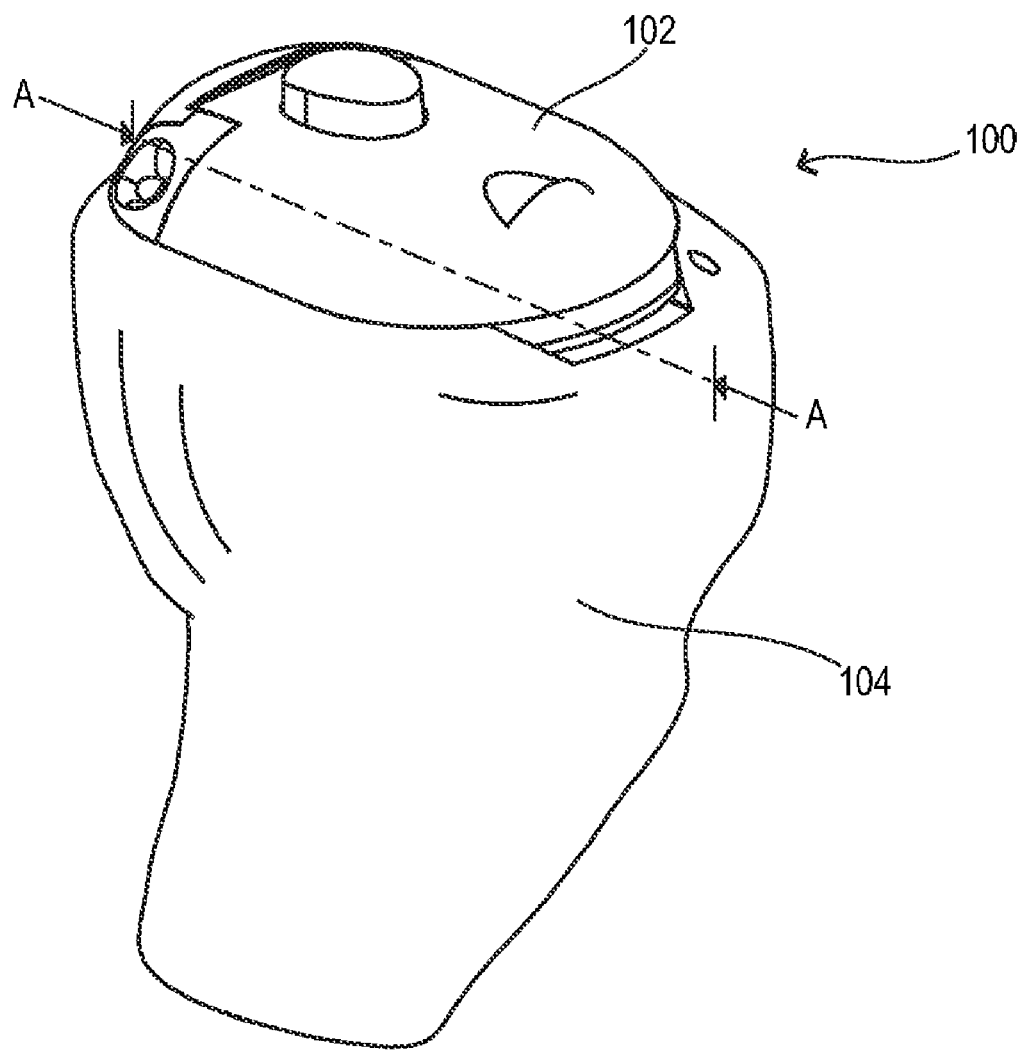
FIG. 1 shows a hearing aid according to the invention.

FIG. 1 shows a hearing aid 100 with a lid 102 and a shell 104. The hearing aid is of the type known within the relevant field as an ITE hearing aid. The shell is manufactured by a digital shell manufacturing method, adapted to customize the shell so that a part of it suits a part of the ear canal of the intended user. Suitable methods of digital shell manufacturing are explained in U.S. Pat. No. 5,487,012, U.S. Pat. No. 6,879,697-B2 and U.S. Pat. No. 6,920,414 B2.

FIG. 2A shows part of the shell with an upper aperture, and a connecting means in the form of a flat plug 200 adapted for insertion into the aperture of the shell. The upper aperture generally defines a battery compartment 106. Within the aperture, the shell has guideways 212, which are open upwards and closed downwards by bottom face 214.

The plug comprises a flat trident with an upper base or web 201 and with three prongs projecting downwards. As visible in FIG. 2A, the web features a forward shallow recess 204. The center prong 202, at its lower end, features a forward nose 210 (forward signifies distally of the battery compartment, ref FIG. 2A), and a rearward lip 206 (rearward signifies proximally of the battery compartment, ref FIG. 2B). In FIG. 2A it also appears that the plug, i.e. the web together with the prongs, provides a rearward concave face conforming to the cylindrical peripheral face of a battery for the hearing aid. Thereby the plug together with parts of a recess in the shell provides the peripheral wall of the battery compartment 106.

In FIG. 2B the plug is shown from the rear side. The plug has two lateral prongs 208 adapted for sliding dovetail engagement with the two guideways 212 in the shell, thereby guiding the plug into the right position in the shell and generally providing lateral support of the plug. The center prong 202 is resilient. On inserting the plug by sliding it in the guideways 212, the nose 210 snaps into and engages a cavity 308 of the shell in order to secure that the plug is kept in a fixed position in the shell.

The plug is produced in a non-conducting, resilient material, e.g. plastics such as polyoxymethylene POM, polyarylamide PAA or polycarbonate PC. The material should be characterized as having a high form stability, resistance to wear and resilience in order to obtain the wanted flexibility and narrow tolerances. The manufacturing method may be injection molding or others as appropriate for the selected material.

It is currently not favored to manufacture the plug in a rapid prototyping process. In a rapid prototyping process, there is an inherent trade-off between resolution and speed, implying that manufacturing of very minute details as those required in the plug is not economically viable. Further, the choice of raw materials is restricted to those suited for laser curing, a factor that rules out structurally favored materials.

Figure 3A:
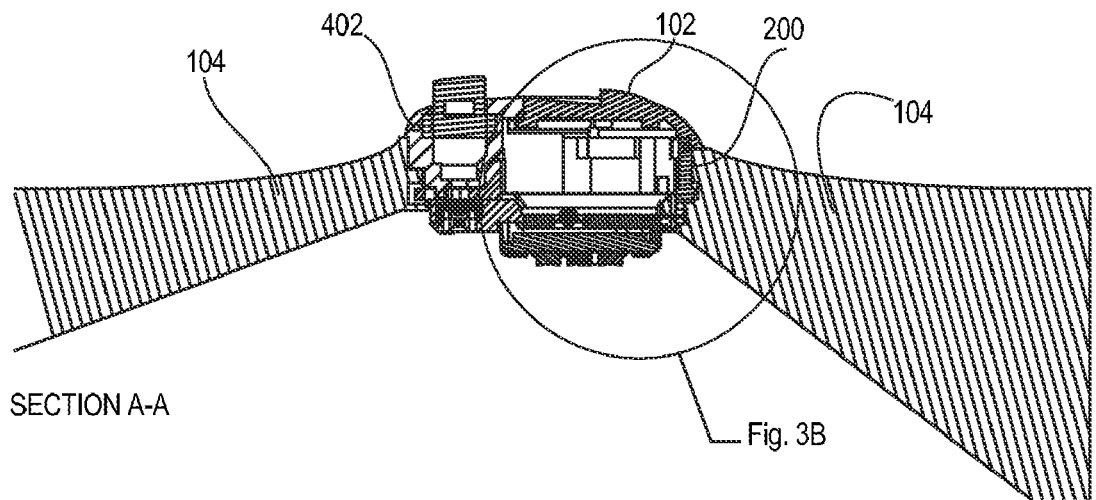
FIG. 3A shows a cross section by the line A-A of FIG. 1, in enlarged, partial view.

FIG. 3A shows a cross section A-A of a part of the hearing aid illustrated in FIG. 1, FIG. 3A including only part of the shell 104 while including the whole of the mounted electronics module and the plug 200. The electronics module comprises a solid body, which is adapted to fit inside the shell and which provides a bottom wall of the battery compartment. The electronics module comprises an encapsulation made of an electrically insulating material, which provides supporting structure for various smaller parts and integrated electrical leads and components, as will be evident to those skilled in the art. The electronics module includes details such as an oblong socket 402 for securing a pin of a pivot for the lid, e.g. as explained in copending application PCT/DK2005/00007 filed in Denmark on 3 Feb. 2005.

The electronics module encapsulation is manufactured by molding or casting or by another method suitable for manufacturing small details with adequate precision.

Figure 3B:
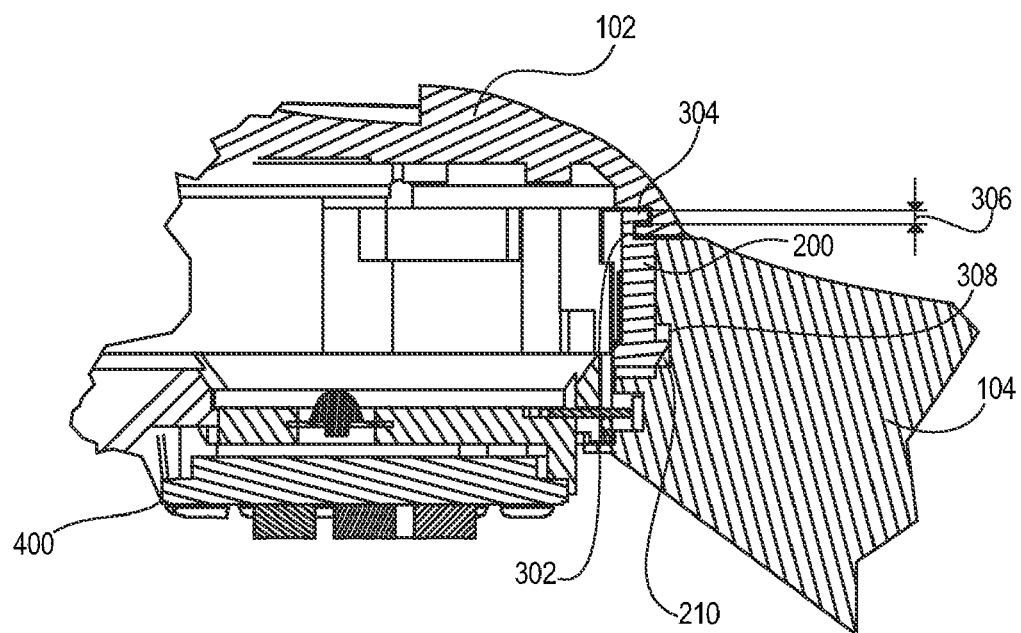
FIG. 3B shows a detail from FIG. 3A in enlarged view.

FIG. 3B is a close up of a detail from FIG. 3A, drawn to illustrate how the electronics module, the plug and the shell mutually interact. In FIG. 3B it appears that the lip 206 of the center prong 202 abuts a part of the electronics module 400 thereby securing that the plug is retained in the guideways in a fixed position and cannot be released as long as the electronics module stays in place. This is an advantage since it prevents accidental removal of the plug. The lip is easily tailored to bridge the gap between the shell and the electronics module. In this way, no special requirements prevail on the electronics module. This has the advantage that a fairly general electronics module may be used, e.g. a module that can be used in different shells or faceplates.

Further, it appears in the figure that the lid 102 comprises a rearward latch 302 that is adapted to engage the forward recess 204 in the web 201 for in this way to latch the lid 102. A rib 304 of the web that projects about 0.25 mm above the adjacent portion of the shell, as illustrated at 306, provides the upper edge of the recess 204, which serves as a striker plate for the latch of the lid. While the plug is supported in the guideways and secured by the electronics module engaging the lip, the web is allowed some lateral flexing, something that bridges manufacturing tolerances on details in the shell, and thereby eases the manufacturing requirements to the shell.

Figure 4A:
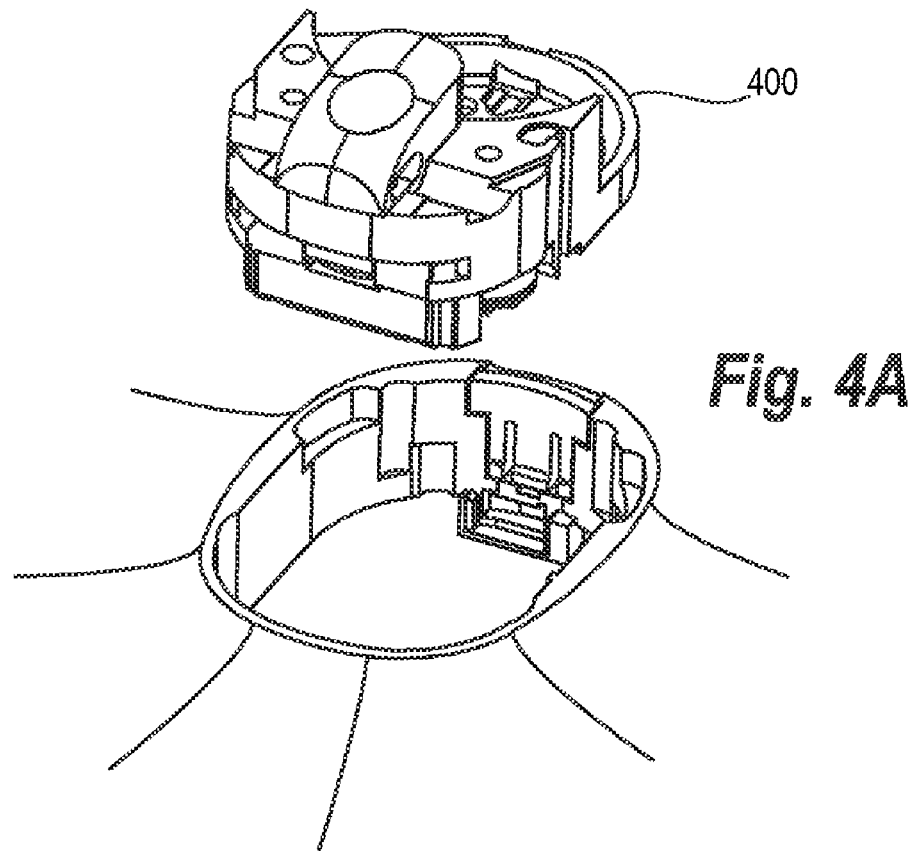
FIG. 4A shows part of the shell together with the electronics module in exploded view.
Figure 4B:
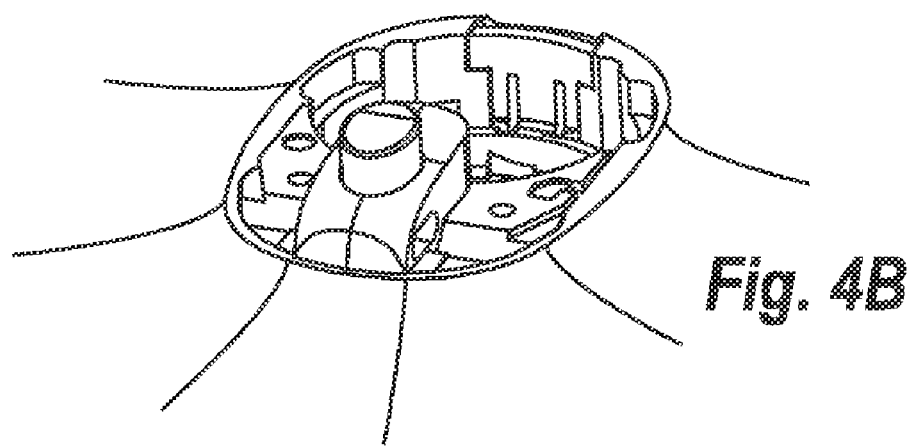
FIG. 4B shows the details of FIG. 4A after the fitting of the electronics module in the shell.

The assembly of the plug and the electronics module is shown by the sequence of steps illustrated in FIG. 2A, FIG. 4A, and FIG. 4B. Starting from the state shown in FIG. 2A, the plug 200 is registered with the guideways in the shell 104 and driven downwards. The plug 200 is correctly mounted once the center prong 202 has snapped into engagement with the shell cavity 308, and the prongs engage the bottom face 214 in the guideways. Thereafter the electronics module is placed in the shell. Once the electronics module 400 has been mounted in the shell 104, the electronics module blocks rearward flexing of the center prong and secures that the nose stays in the engagement on the cavity in order that the plug can no longer be displaced along the guideways without first removing the electronics module. In this position, the plug is supported laterally by the engagement of the lateral prongs in the guideways.

Once these parts have been assembled, mounting a pin in the socket 402 of the electronics module fits the lid. As shown in copending application PCT/DK2005/00007 filed in Denmark on 3 Feb. 2005, the lid includes spring loaded battery contacts. The lid is closed by pivoting it down, squeezing down the battery springs, and then sliding the lid backwards until the latch engages the cavity of the plug. In this position the lid is anchored and secured.

I claim:

1. A method of assembling a part of a hearing aid, comprising:
    manufacturing a shell by a rapid prototyping process, said shell having an aperture and a guide means;
    providing a plug;
    providing said plug with a resilient prong with a latch;
    providing an electronics module;
    inserting said plug into said aperture by sliding said plug along said guide means; and
    mounting said electronics module into the shell after inserting said plug, said electronics module being adapted to secure said plug in a fixed position.

2. A method of assembling a part of a hearing aid, comprising:
    manufacturing a shell by a rapid prototyping process, said shell having an aperture and a guide means;
    providing a plug;
    providing a lid, said lid having a projection;
    providing said plug with a recess adapted to receive said projection;
    providing an electronics module;
    inserting said plug into said aperture by sliding said plug along said guide means; and
    mounting said electronics module into the shell after inserting said plug, said electronics module being adapted to secure said plug in a fixed position.

3. A method of assembling a part of a hearing aid, comprising:
    manufacturing a shell by a rapid prototyping process, said shell having an aperture and a guide means;

providing a plug;
providing said plug with a resilient prong with a forward nose;
providing an electronics module;
inserting said plug into said aperture by sliding said plug along said guide means; and
mounting said electronics module into the shell after inserting said plug, said electronics module being adapted to secure said plug in a fixed position.

* * * * *